I. T. MARTIN & W. L. JONES.
CLUTCH.
APPLICATION FILED APR. 5, 1910. RENEWED JAN. 12, 1911.

985,046.

Patented Feb. 21, 1911.

2 SHEETS—SHEET 1.

Witnesses
H. A. Stock
H. C. Schroeder

Inventors,
Ira T. Martin,
William L. Jones,
By E. E. Vrooman
Attorney

I. T. MARTIN & W. L. JONES.
CLUTCH.
APPLICATION FILED APR. 5, 1910. RENEWED JAN. 12, 1911.
985,046.
Patented Feb. 21, 1911.
2 SHEETS—SHEET 2.
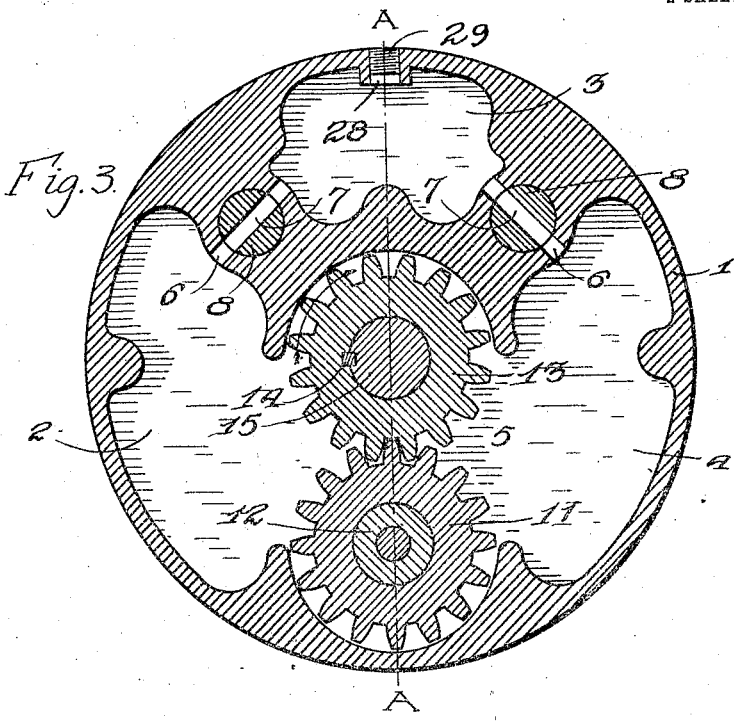
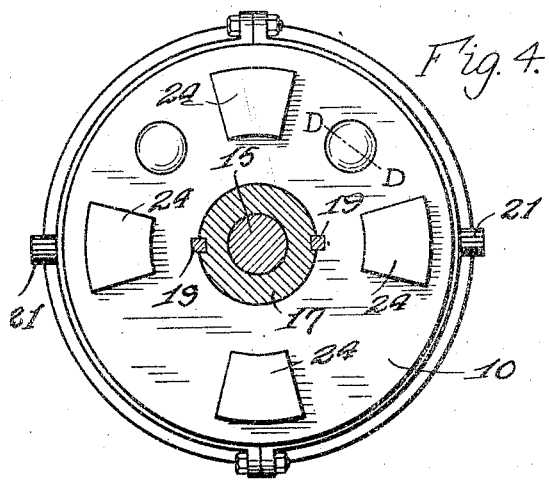
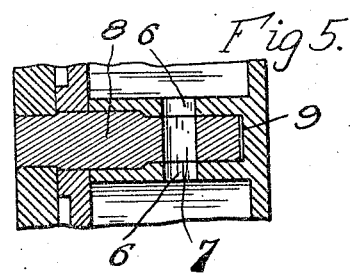
Witnesses
A. A. Stock
H. C. Schroeder
Inventors
Ira T. Martin,
and William L. Jones
By E. E. Vrooman,
Attorney

UNITED STATES PATENT OFFICE.

IRA T. MARTIN AND WILLIAM L. JONES, OF OAKLAND, CALIFORNIA.

CLUTCH.

985,046.  Specification of Letters Patent.  Patented Feb. 21, 1911.

Application filed April 5, 1910, Serial No. 553,522. Renewed January 12, 1911. Serial No. 602,348.

*To all whom it may concern:*

Be it known that we, IRA T. MARTIN and WILLIAM L. JONES, citizens of the United States, residing at Oakland, in the county of Alameda and State of California, have invented certain new and useful Improvements in Clutches, of which the following is a specification.

This invention relates to transmission mechanisms by means of which power is transmitted at the same or reduced speed without the shifting of belts or gears, thereby avoiding sudden shocks or jars.

The invention has for its object to provide an improved device of this character whereby the driven mechanism may be started or stopped while the driving mechanism is in motion.

The invention further has for its object to provide a coupling device between the driving and driven mechanism which avoids the use of the adhesion of two or more surfaces.

The invention has further for its object to provide an improved device of this character which is specially adapted for use in the driving of automobiles; in the transmission of power from gas engines and induction motors, and with other devices of low starting torque, whereby they may be started under no load, and brought gradually up to speed; and for use with hoists and machines where it is desired to start, stop and change the speed, without stopping the source of power.

The invention consists in an improved transmission device, and in details of construction thereof as hereinafter set forth and claimed.

In carrying out the objects of the invention, as hereinbefore stated, it is to be understood that the essential features thereof are susceptible of changes in design and structural arrangement, one preferred and practical arrangement being shown in the accompanying drawings to illustrate the invention.

Figure 1:
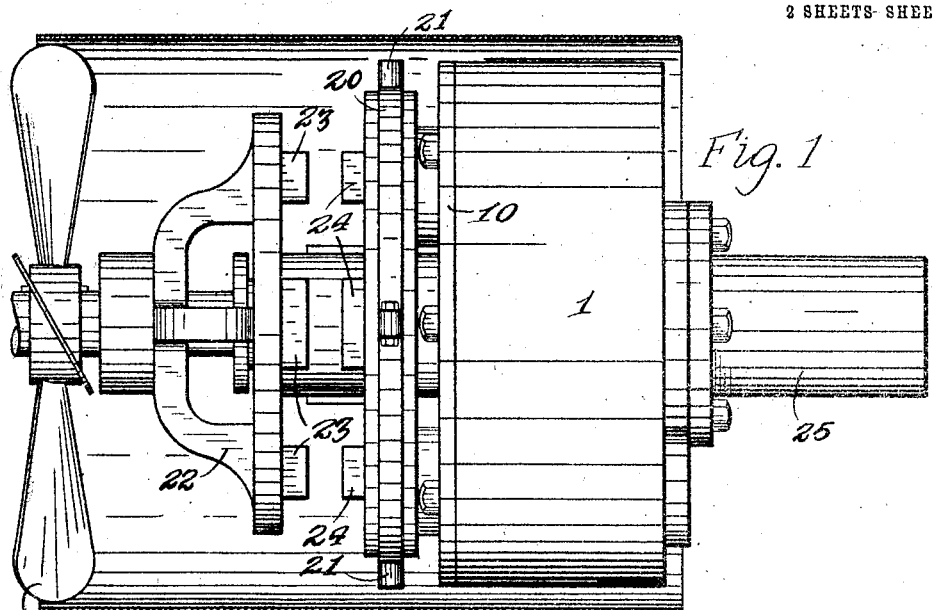
Figure 2:
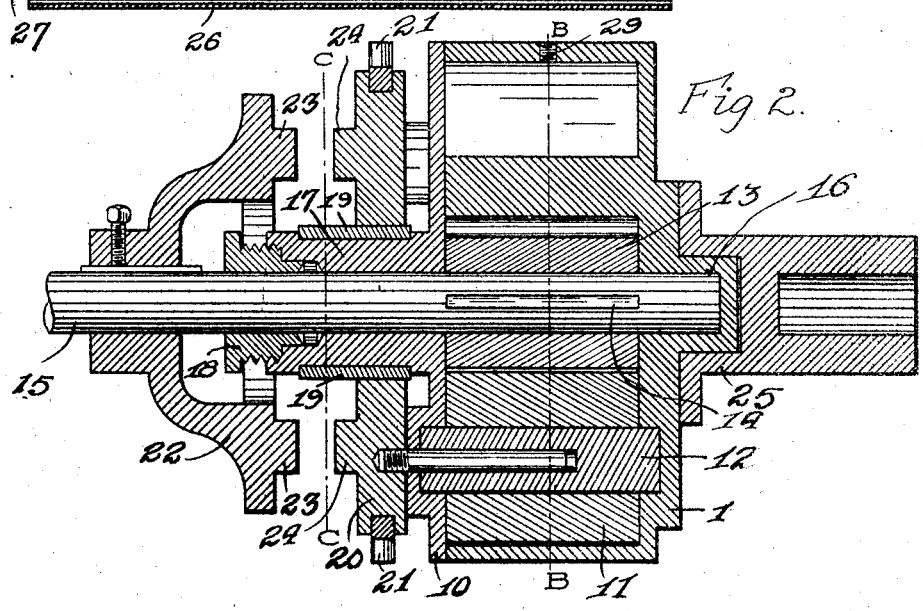

Referring to the accompanying drawings,—Figure 1 is a view in side elevation with the casing in longitudinal section, of a transmission device constructed in accordance with this invention. Fig. 2 is a view in longitudinal section of the invention with the casing removed, taken on the line A—A of Fig. 3. Fig. 3 is a transverse section thereof, taken on the line B—B of Fig. 2. Fig. 4 is an end view in cross-section on the line C—C of Fig. 2. Fig. 5 is an enlarged detail view in longitudinal section of a portion of the device.

To illustrate the carrying out of the invention, a cylindrical casing 1 is provided, formed with the chambers 2, 3, and 4, the chambers 2 and 4 communicating with each other through the openings 5, and communicating with the chamber 3, by means of openings 6 communicating with openings 7 in slide valves 8 mounted in sockets 9 in the casing 1, said valves 8 being mounted at one end in a disk or cover 10 suitably secured to one end of the casing 6.

Inclosed within the casing 6 is a toothed gear wheel 11 mounted to turn freely on a spindle 12 projecting from the side of the casing 1, and meshing with a toothed gear wheel 13, secured by a feather 14 to a driving shaft 15 connected with a suitable source of power and having its rear end mounted in a socket 16 on one side of the casing 1, said shaft 15 extending through the hub 17 projecting from the cover 10 and through a stuffing box 18. Mounted upon the hub 17 and adapted to slide freely longitudinally thereon but prevented from turning by keys 19, is a head or disk 20. Attached to this head 20 are the stems of the valves 8. The head 20 may be shifted from one position to another by a ring 21 which runs freely in a groove in the head 20. Upon the shaft 15 is also mounted a spider 22 having clutch jaws 23, which mesh with similar jaws 24 on the head 20. The spider 22 may be rigidly fixed upon the shaft 15, as shown, or may slide upon a key and be provided with means for shifting it into and out of engagement with the head 20. On the back of the casing 1 is rigidly secured a flanged socket projection 25 with which the driven shaft or machinery may be connected.

Inclosing the mechanism hereinbefore described is a casing 26, through which air is forced by means of a fan 27. The casing 1 is provided with an opening 28 through which the casing may be filled, said opening being closed by a plug 29.

The operation of the device is as follows: Power being applied to the shaft 15, the toothed wheel 13 is caused to revolve in the direction of the arrow. The liquid in the casing 6 is carried from chamber 2 to chamber 4, and if the valve is in the position shown in Fig. 5, the liquid passes through the openings 6 and 7 in the valve to chamber 3, and thence through the openings 6 and 7 in the other valve to chamber 11. The passages 6 and 7 are of such a size that the liquid circulates through them, the pressure of the liquid in all the chambers remaining practically equal, thus permitting the gear wheel 11 to revolve at the same speed as the gear wheel 13, the casing 1 remaining stationary. Now, by shifting the head 20 toward the spider 22, the valves 8 are slid in their casing so as to narrow the openings 6 and 7, thereby limiting the flow of liquid through the valves and causing a pressure in chamber 4, which pressure becomes greater and greater as the valve passages are more and more narrowed. The liquid pressure within the chamber 4 retards the action of the gear wheel 11 on its spindle 12, thereby causing it to rotate about the main shaft 15 in the same direction as gear wheel 13. When the casing 1 revolving around the main shaft 15 has reached the desired speed, the valves 8 are fixed in the proper position and the heat generated within the casing is transmitted to the surface and carried away by the blast from the fan 27. When a direct drive is desired from the shaft 15 to the hub or socket projection 25 on the casing 1, the latter is brought up to its maximum speed by moving the head 20 toward the spider 22 until the lugs 24 engage lugs 23, or if the spider 22 slides upon the shaft 15 by means of a key, the head 20 is moved to position to close the valves 8, and then locked by shifting the spider 22 until the lugs 23 and 24 are engaged. It will be understood that the device may operate in either direction, not being confined to the direction hereinbefore described.

It will be seen that by means of this invention an effective transmission device is provided which may be readily connected and disconnected with a driven device while the driving device is in motion, and by means of which, also, the driven device may be started under no load and brought gradually up to speed. By means of this invention, also, a driven device may be started and stopped and the speed changed without stopping the source of power.

Having described the invention, we claim:

1. In a transmission device of the character described, a power-driving shaft, a liquid circulating casing, loosely and revolubly mounted on said shaft and having means for connecting it with a driven shaft, a planetary gearing in said casing connecting the power shaft with the casing, means for regulating the circulation of liquid through said casing, a cylindrical casing inclosing said transmission device, and a fan on said power shaft in said cylindrical casing adjacent to said transmission device.

2. In a transmission device of the character described, a power-driving shaft, a cylindrical, revoluble casing loosely mounted on said shaft and having a circular series of liquid circulating chambers, two of which communicate with each other, a planetary gearing located in said casing between said chambers and consisting of a toothed pinion fixed on the driving shaft and a loose pinion meshing with said toothed pinion, slide valves located between said chambers and a third chamber, a slidable adjustable head mounted on said casing and connected with said slide valves and provided with clutch projections, a spider mounted on said driving shaft and having clutch projections adapted to be engaged by said head, and means for connecting said casing with a driven shaft.

In testimony whereof we affix our signatures in presence of two witnesses.

IRA T. MARTIN.
WILLIAM L. JONES.

Witnesses:
H. C. SCHROEDER,
F. J. SCHROEDER.